(12) United States Patent
Fortner (10) Patent No.: US 9,567,250 B2
(45) Date of Patent: Feb. 14, 2017

(54) METHODS, SYSTEMS, AND APPARATUS FOR DISPOSAL OF OILFIELD WASTE WATER

(71) Applicant: William Olen Fortner, Gillette, WY (US)

(72) Inventor: William Olen Fortner, Gillette, WY (US)

( * ) Notice: Subject to any disclaimer, the term of this patent is extended or adjusted under 35 U.S.C. 154(b) by 249 days.

(21) Appl. No.: 14/570,741

(22) Filed: Dec. 15, 2014

(65) Prior Publication Data

US 2015/0166384 A1 Jun. 18, 2015

Related U.S. Application Data

(60) Provisional application No. 61/916,415, filed on Dec. 16, 2013.

(51) Int. Cl.
| | | |
|---|---|---|
| C02F 1/04 | (2006.01) | |
| C02F 9/00 | (2006.01) | |
| B01D 1/02 | (2006.01) | |
| B01D 1/30 | (2006.01) | |
| B01D 1/00 | (2006.01) | |
| C02F 1/18 | (2006.01) | |
| F22B 1/18 | (2006.01) | |
| C02F 1/44 | (2006.01) | |
| C02F 1/38 | (2006.01) | |

(Continued)

(52) U.S. Cl.
CPC .............. *C02F 9/00* (2013.01); *B01D 1/0041* (2013.01); *B01D 1/02* (2013.01); *B01D 1/30* (2013.01); *C02F 1/048* (2013.01); *C02F 1/18* (2013.01); *F22B 1/18* (2013.01); *C02F 1/20* (2013.01); *C02F 1/38* (2013.01); *C02F 1/441* (2013.01); *C02F 2101/32* (2013.01); *C02F 2103/10* (2013.01); *C02F 2103/365* (2013.01); *C02F 2201/008* (2013.01)

(58) Field of Classification Search
CPC ....... C02F 3/1263; C02F 2103/10; C02F 1/04; C02F 1/16; C02F 1/043; C02F 1/18; C02F 1/385; E21B 43/34
USPC ....... 122/406.1, 406.2, 406.3; 210/252, 259; 159/22, 25.1, 28.1, 28.4, 16.3
See application file for complete search history.

(56) References Cited

U.S. PATENT DOCUMENTS 6,971,238 B1 * 12/2005 Walker ................. E21B 41/005
 60/641.2
7,251,939 B2 * 8/2007 Walker .................... F01K 21/00
 60/641.2

(Continued)

*Primary Examiner* — Gregory A Wilson
(74) *Attorney, Agent, or Firm* — Morriss O'Bryant Compagni, PC (57) ABSTRACT

Systems and methods for disposing of produced water as steam released into the atmosphere. After wastewater is prepared for disposal by suitable filtering and/or treatment, it flows into a preheating tank where it is heated prior to disposal by liquid filled preheating coils extending from the heating tank which are heated by burner boxes. From the preheating tank, the preheated water flows into evaporation coils, where it is heated above boiling and released as steam. Water flowing into the tank passes adjacent the evaporation and preheating coils near the burner boxes. The preheating coils may contain antifreeze which can be circulated to prevent freezing of the preheat tank when not in use or to maintain the temperature of the preheat tank. The system may be moved with the preheat tank filled with preheated water to facilitate the use another location.

20 Claims, 6 Drawing Sheets

(51) Int. Cl.
  *C02F 103/10* (2006.01)
  *C02F 101/32* (2006.01)
  *C02F 1/20* (2006.01)
  *C02F 103/36* (2006.01)

(56) References Cited

U.S. PATENT DOCUMENTS

| | | | |
|---|---|---|---|
| 7,520,993 B1 * | 4/2009 | Laraway | B01D 61/58 210/175 |
| 7,591,309 B2 * | 9/2009 | Minnich | C02F 1/04 159/47.1 |
| 7,845,314 B2 * | 12/2010 | Smith | B01D 1/0058 122/31.2 |
| 8,173,025 B2 | 5/2012 | Reidhead et al. | |
| 8,173,026 B2 | 5/2012 | Rasmussen et al. | |
| 8,211,303 B2 * | 7/2012 | Page | B01D 17/0214 210/104 |
| 8,746,336 B2 * | 6/2014 | Minnich | E21B 43/24 166/272.3 |
| 8,852,394 B2 * | 10/2014 | Panz | B01D 1/14 122/31.2 |
| 2010/0089740 A1 * | 4/2010 | Vuong | C02F 1/042 203/10 |
| 2016/0009582 A1 * | 1/2016 | Heimel | C02F 9/00 210/638 |
| 2016/0115062 A1 * | 4/2016 | Krieger | C02F 9/00 210/241 |

* cited by examiner

METHODS, SYSTEMS, AND APPARATUS FOR DISPOSAL OF OILFIELD WASTE WATER

CROSS REFERENCE TO RELATED APPLICATIONS

This application claims priority to and incorporates by reference all of the subject matter included in Provisional Patent Application Ser. No. 61/916,415, which was filed Dec. 16, 2013.

TECHNICAL FIELD

The present disclosure relates to disposing of oilfield waste water following treatment.

BACKGROUND

Substantial amounts of wastewater are generated by oilfield and other underground drilling operations. Typically, this wastewater requires treatment before it can be released, in order to comply with applicable standards. However, even following treatment, release of the water may be problematic. There may be no suitable body of water to release it into, or it may be in amounts above those allowed by law. This can lead to paying for the water to be removed by truck at a considerable expense.

Because of these difficulties, there have been several attempts to dispose of produced water by releasing it into the atmosphere as steam. Some examples include U.S. Pat. Nos. 6,971,238, 7,251,939, and 7,845,314. The disclosures of each of these references are incorporated herein in their entireties. However, these approaches often require complicated setups for using the steam for another purpose.

An apparatus, system, or method that allowed for easy disposal of the treated produced water at a lower cost would be an improvement in the art. Such an apparatus or system that was easily portable to move as field conditions change would be a further improvement in the art.

SUMMARY

The present disclosure includes systems and methods for disposing of produced water as steam released into the atmosphere. After wastewater is prepared for disposal by suitable filtering and/or treatment, it flows into a preheating tank where it is heated prior to disposal by liquid filled preheating coils extending from the heating tank which are heated by burner boxes. From the preheating tank, the preheated water flows into evaporation coils, where it is heated above boiling and released as steam. Water flowing into the tank passes adjacent the evaporation and preheating coils near the burner boxes. The preheating coils may contain antifreeze which can be circulated to prevent freezing of the preheat tank when not in use or to maintain the temperature of the preheat tank. The system may be moved with the preheat tank filled with preheated water to facilitate the use another location. Methods may include calculating the costs of disposal and switching between steam evaporation and another method (hauling the water away by truck) as the costs of fuel varies.

DESCRIPTION OF THE DRAWINGS

It will be appreciated by those of ordinary skill in the art that the various drawings are for illustrative purposes only. The nature of the present disclosure, as well as other embodiments thereof, may be more clearly understood by reference to the following detailed description, to the appended claims, and to the several drawings.

DETAILED DESCRIPTION

The present disclosure relates to apparatus, systems and methods for disposing of produced water by release of steam. It will be appreciated by those skilled in the art that the embodiments herein described, while illustrating certain embodiments, are not intended to so limit this disclosure or the scope of the appended claims. Those skilled in the art will also understand that various combinations or modifications of the embodiments presented herein can be made without departing from the scope of the present disclosure. All such alternate embodiments are within the scope of the present disclosure.

Figure 1:
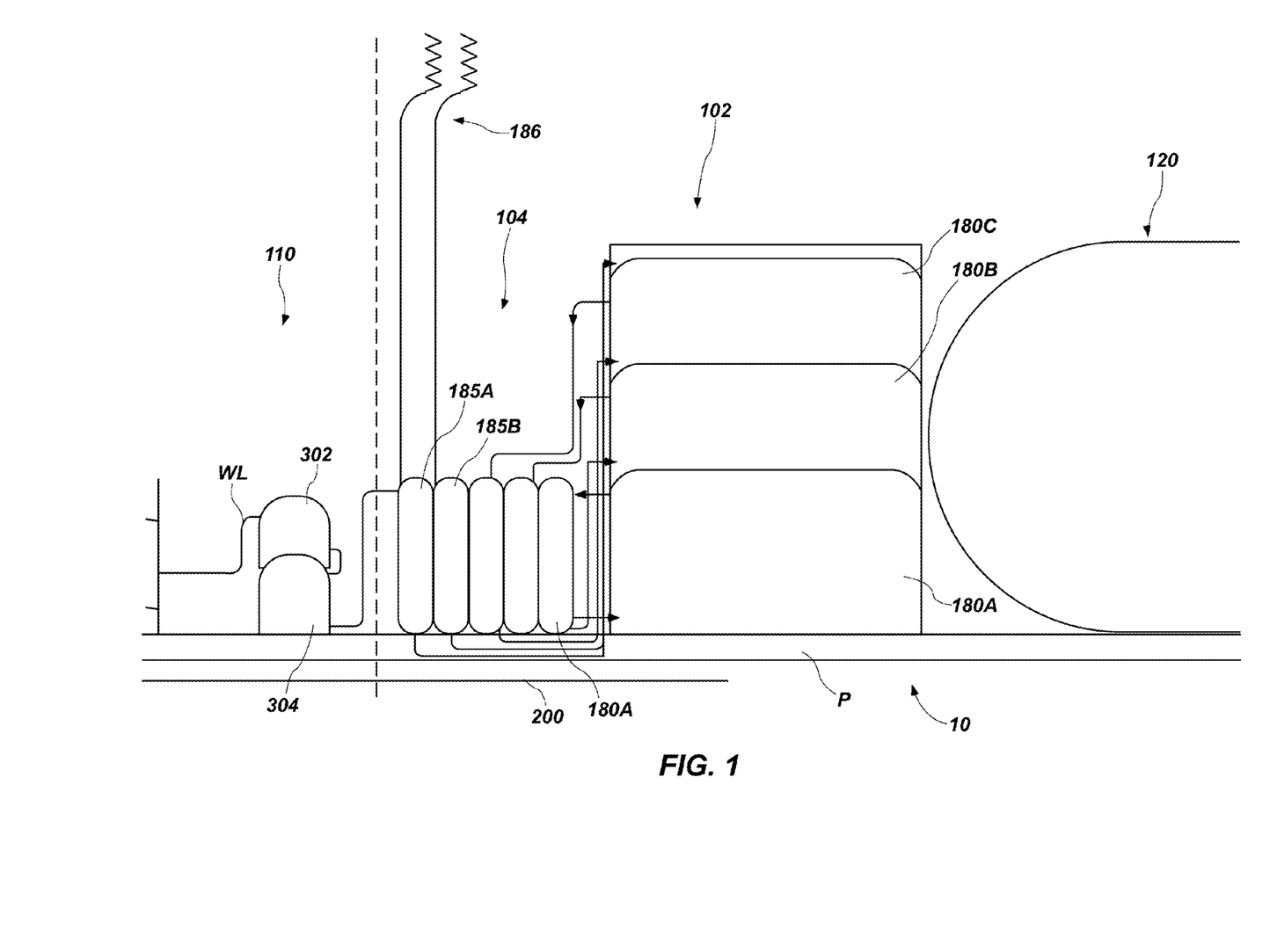
FIG. 1 is a schematic view of a produced water disposal system in accordance with one aspect of the present disclosure.
Figure 2:
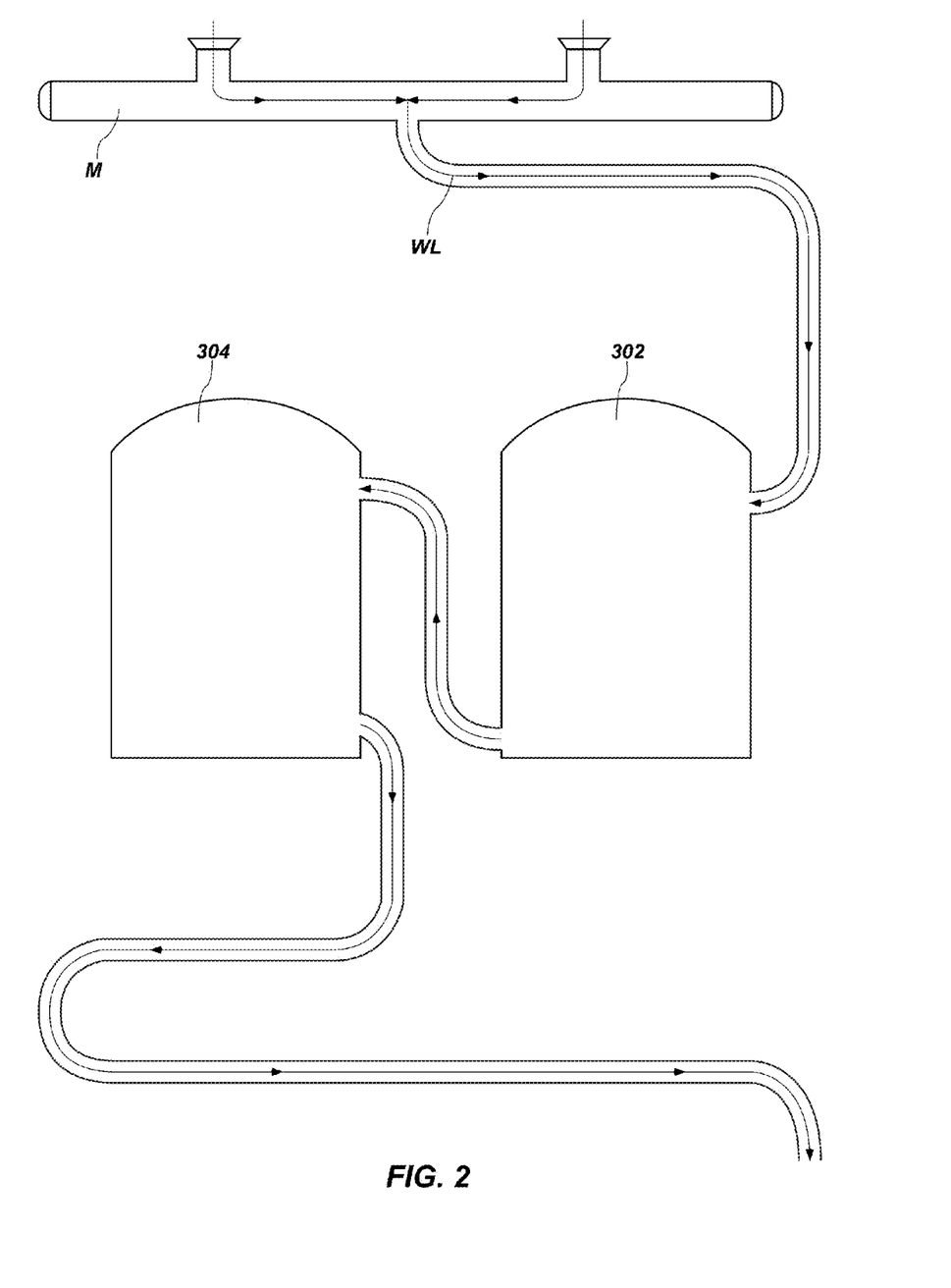
FIG. 2 is a schematic view of the produced water input of the system of FIG. 1.
Figure 3:
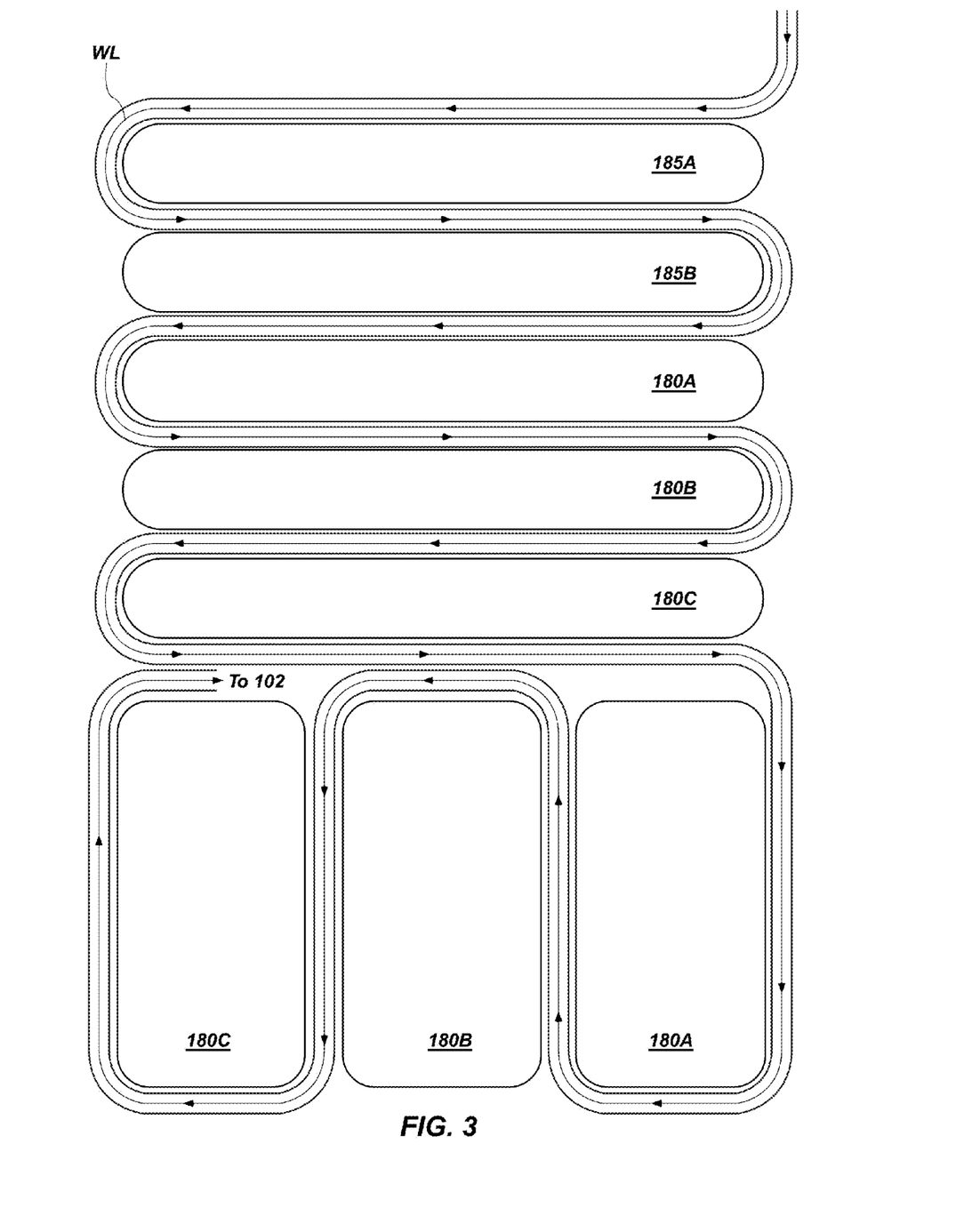
FIG. 3 is a schematic view of a portion of FIG. 1 depicting the flow of the water from the predisposal treatment portion depicted in FIG. 2 to the preheat tank of FIG. 1.

Referring to FIGS. 1, 2, and 3, one embodiment of a water disposal system 10 in accordance with the principles of the present disclosure is depicted. The system 10 may be sized for installation on a platform P, which may be a trailer or skid, allowing it to be moved as field conditions change, or as price fluctuations make it more or less expensive than other methods of disposal. Where installed on a trailer, the system 10 may be easily moved as needed. Where installed on a skid it may be mounted at a location for an extended period of time while remaining mobile. For example, a smaller skid mounted system could be placed near a single well and used for a period of months or years, then moved to another well at a later time.

Following treatment, which may vary depending on the local regulations governing water quality prior to release and the particular contaminants found in untreated produced water at that location, produced water is fed into the system 10 through a water line WL, into a separation system 110, which is depicted in more detail in FIG. 2. The produced water may be collected from various sources by a manifold M, or may be input by a holding tank depending on the installation, the produced water flows through a line WL to a first centrifuge 302 where oil and gas are removed. The removed oil and gas may be collected for use or for treatment and proper disposal. The first centrifuge 302 may be any suitable centrifuge as known in the art for separation of water and petroleum, so long as it is sufficient in size to supply the needed flow quantities. It will be appreciated that for large scale embodiments, the first centrifuge 302 may be a plurality of centrifuges operating in parallel.

From the first centrifuge 302, output water may continue to a second centrifuge 304 for removal of solids and salts, such as scale or debris from the produced water. The second centrifuge 304 may be any suitable centrifuge as known in the art for separation of salts and solids from water, so long as it is sufficient in size to supply the needed flow quantities. It will be appreciated that for large scale embodiments, the second centrifuge 304 may be a plurality of centrifuges operating in parallel. In some applications no pretreatment may be necessary, or other pretreatment may be and the separation system 110 may contain additional treatment equipment or processes for compliance. For example, RO and/or other treatment processes may be included as may be required.

The water flows from the separation system 110 into a preheat water tank 102, following a path that winds the line WL through the burn area 104, as best depicted in FIG. 3, as discussed further herein.

The preheat water tank 102 may be a tank of suitable size, which will vary depending on the installation. In a typical installation the tank 102 will have insulated walls for maintaining heat.

The preheat water tank 102 has heating coils 180 which contain antifreeze running through it. Each set of coils 180 extends out of the preheat tank 102 and into the burn area 104, where it passes over a burner unit 200. Each burner unit 200 contains a burner which is supplied with fuel, as from propane tank 120. The liquid in the coils 180 circulates from the burn area 104 where it is heated over the burn units 200 though the coils 180 and into the preheat tank 102, raising the temperature of the water in the preheat tank to about 250 degrees Fahrenheit. The produced water flows into the preheat tank 102 near a lower end thereof and heated water is removed from the top end to evaporation coils 185. The evaporation coils pass over the burn area 104 and the water is heated past boiling and released as steam from the open end 186 of the coils. In the depicted embodiment, there are two sets of evaporation coils 185A and 185B and three sets of antifreeze coils 180A, 180B, and 180C. It will be appreciated that different numbers may be used as may be suited for the size and usage of a particular installation.

As depicted in FIG. 3, as the supply line WL passes from the separation system 110 to the preheat tank 102, it winds through the coils 180 and 185 in the burn area 104. The coils may be in contact to allow heat transfer from the coils to the waterline, heating the produced water as it travels to the preheat tank 102. In some embodiments, this may function as a countercurrent heat exchange mechanism to preheat the produced water.

The water in the preheat tank may be heated to about 250 degrees Fahrenheit. This reduces the amount of fuels needed to continue to heat the water past boiling as it flows into the evaporation coils 185, and by warming the water flowing in from the separation system 110 reduces the amount of energy needed overall.

When the system 10 is moved from one location to another for use, the preheat tank 102 may be kept filled with preheated water, with circulation of antifreeze in coils 180 continued during the move. This can reduce the time and cost of heating water for disposal at the new location. Where the system 10 is closed down for a time period (such as overnight), the circulation of antifreeze in the coils 180 and the preheated water may prevent the system from freezing as temperatures drop below freezing at installed locations.

Although propane tank 120 is shown as the source of fuel, it will be appreciated that other fuels may be used. For example, where used in a field producing natural gas, the produced gas may be directly used as fuel for disposal of produced water.

Figure 4:
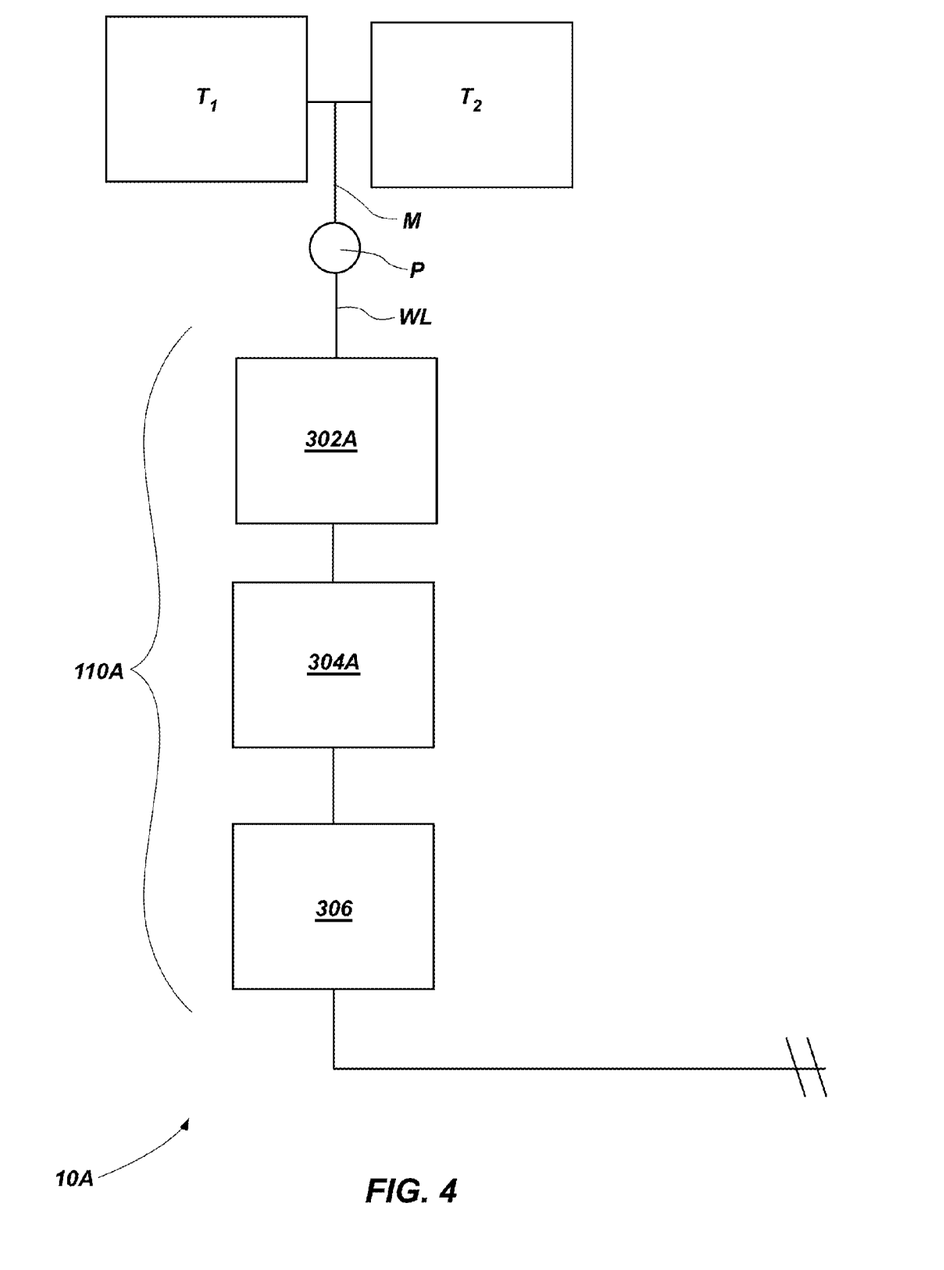
FIGS. 4 and 5 are schematic views of a produced water input and a preheat and disposal portion of a second produced water disposal system in accordance with the principles of the present disclosure.
Figure 5:
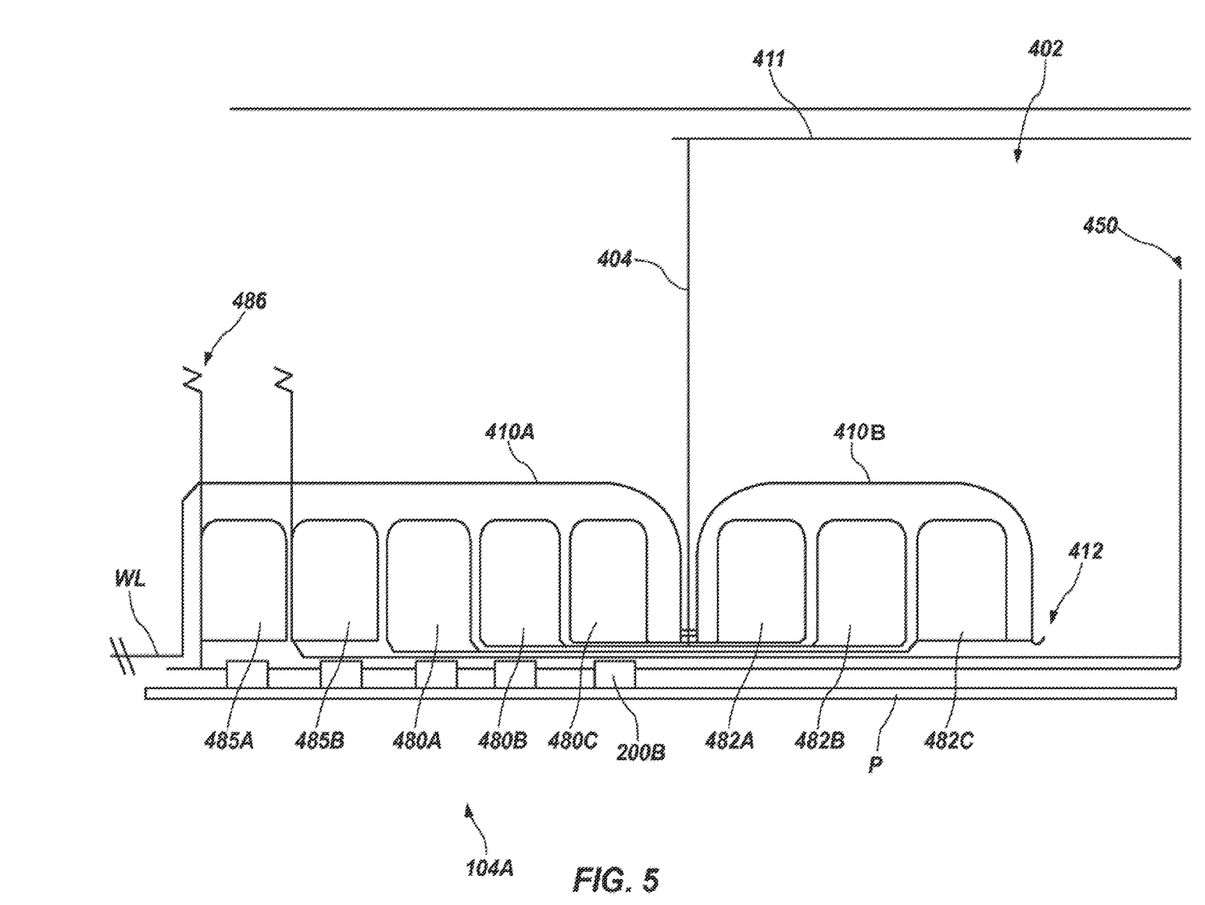

Referring to FIGS. 4 and 5, a second embodiment of a water disposal system 10A in accordance with the principles of the present invention is depicted. The system 10A may be sized for installation on a platform, which may be a trailer or skid, allowing it to be moved as field conditions change, or as price fluctuations make it more or less expensive than other methods of disposal. Where installed on a trailer, the system 10A may be easily moved as needed. Where installed on a skid it may be mounted at a location for an extended period of time while remaining mobile.

Following treatment, which may vary depending on the local regulations governing water quality prior to release and the particular contaminants found in untreated produced water at that location, produced water is fed into the system 10A through a water line WL, into a separation system 110, as depicted in FIG. 4. The produced water may be collected from various sources by a manifold M, or may be input by one or more holding tanks, such as T1 and T2, depending on the installation. Where necessary a pump P may be used to move the produced water from a source or holding tank.

The produced water flows through a line WL to a first centrifuge 302A where oil and gas are removed. The removed oil and gas may be collected for use or for treatment and proper disposal. The first centrifuge 302A may be any suitable centrifuge as known in the art for separation of water and petroleum, so long as it is sufficient in size to supply the needed flow quantities. It will be appreciated that for large scale embodiments, the first centrifuge 302A may be a plurality of centrifuges operating in parallel.

From the first centrifuge 302A, output water may continue to a second centrifuge 304A for removal of solids and salts, such as scale or debris from the produced water. The second centrifuge 304A may be any suitable centrifuge as known in the art for separation of salts and solids from water, so long as it is sufficient in size to supply the needed flow quantities. It will be appreciated that for large scale embodiments, the second centrifuge 304A may be a plurality of centrifuges operating in parallel.

As discussed previously herein, in some applications no pretreatment may be necessary, or other pretreatment may be required and the separation system 110A may contain additional treatment equipment or processes for compliance. For example, in the depicted embodiment, water output of the second centrifuge 304A is passed to a Reverse Osmosis system 306 for additional purification. Other treatment processes may be included as may be required.

The water flows from the separation system 110A into a preheat water tank 402, following a path that winds through the burn area 104A. The preheat water tank 402 may be a tank of suitable size, which will vary depending on the installation. In a typical installation the tank 402 will have insulated walls 411 for maintaining heat. The tank 402 and the burn area 104A may all be placed on a common platform P, such as a trailer or skid.

Figure 6:
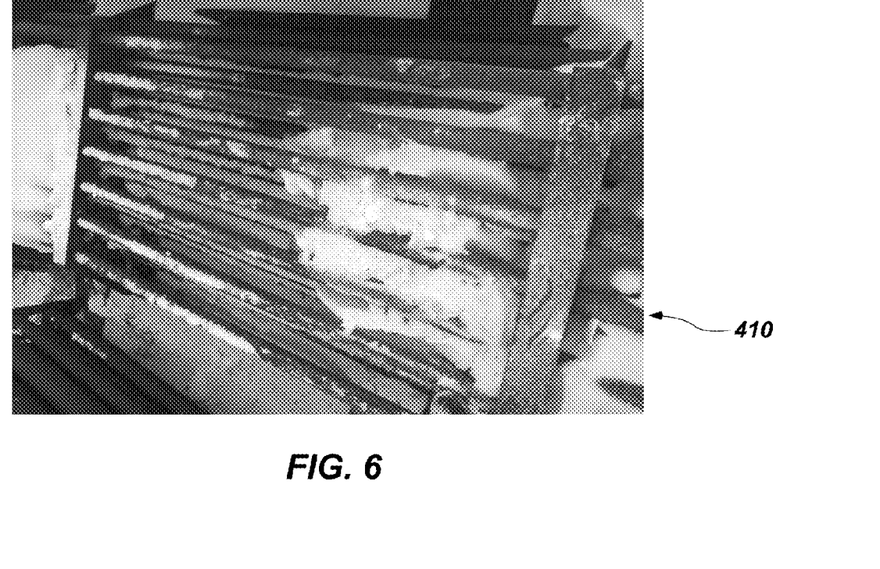
FIG. 6 is an illustration of a winding radiator that may be used in accordance with one embodiment of the system of FIGS. 4 and 5.
Figure 7:
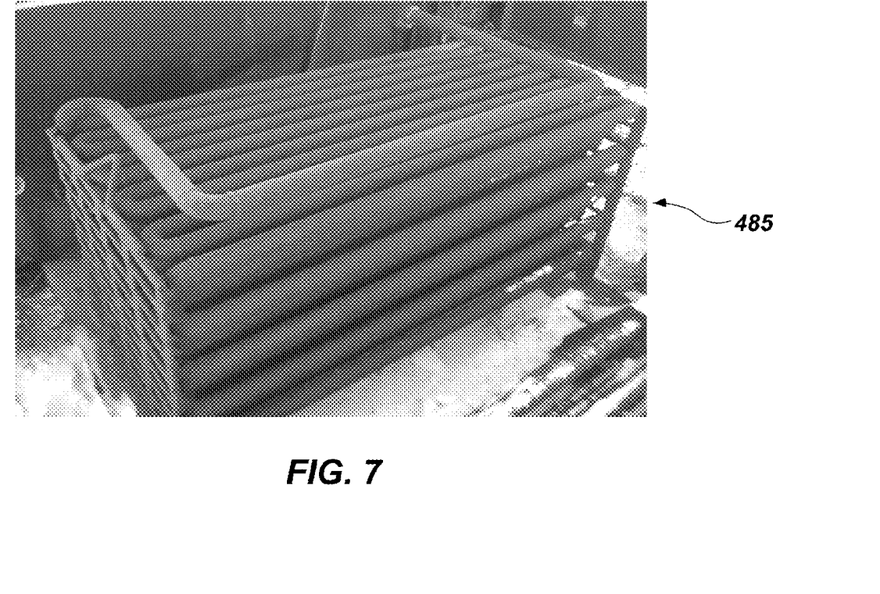
FIG. 7 is an illustration of a radiator "bank" that may be used in accordance with one embodiment of a system of FIGS. 4 and 5.

As depicted, the water may flow through a winding radiator line 410A, similar to that depicted in FIG. 6, which lies over the top of banks 485A and 485B of the evaporation coils and antifreeze preheat coils 480A, 480B and 480C (discussed further below). The coil banks may be formed as individual units, similar to the radiators bank depicted in FIG. 7. This allows for the water flowing through the winding radiator line 410A to be preheated as in FIG. 2 using heat from the evaporation and preheat coils, (which may be a countercurrent heat exchange) but can ease repair by the use of interchangeable banks and coils and allow easier access to individual parts as compared to intertwined windings.

As depicted, the water line entering the tank may continue as a winding radiator line 410B adjacent antifreeze coil bank units in the tank 402, such as those depicted at 482A, 482B and 482C before discharge into the tank. These units may be similar or interchangeable with those depicted in FIG. 7 to allow for replacement and repair.

The preheat water tank 402 has heating coils 480 (in the depicted embodiment three sets 480A, 480B and 480C) which each contain antifreeze running through it. Each set of coils 480 extends out of the preheat tank 402 and into the burn area 104A, where it passes over one or more burner units 200A. Each burner unit 200A contains a burner which is supplied with fuel, as from propane tank, natural gas well or otherwise. For example, an individual burner may be associated with each coil 480 allowing individual coils to be selected for use at different installations. Where appropriate, the burner units may use fuel vaporizers.

The antifreeze liquid in the coils 480 circulates from the burn area 104A where it is heated over the burn units 200A through the coils 480 and into the preheat tank 402, raising the temperature of the water in the preheat tank to about 250 degrees Fahrenheit. As depicted, the coils 480 in the tank may consist of individual bank radiator units 482, as discussed previously herein. It will be appreciated that although three sets of evaporation coils are depicted in FIG. 4, that more or fewer may be used depending on the particular installation.

The produced water flows into the preheat tank 402 near a lower end thereof through the discharge 412 and heated water is removed from the top end to evaporation coils 485 though one or more evaporation lines 450. The evaporation coils 485 pass over the burn area 104A and the water is heated past boiling and released as steam from the open end 486 of the coils. In the depicted embodiment, there are two sets of evaporation coils 485A and 485B. It will be appreciated that different numbers may be used as may be suited for the size and usage of a particular installation.

The water in the preheat tank 402 may be heated to about 250 degrees Fahrenheit. This reduces the amount of fuel needed to continue to heat the water past boiling as it flows into the evaporation coils 485, and by warming the water flowing in from the separation system 110A reduces the amount of energy needed overall.

When the system 10A is moved from one location to another for use, the preheat 402 tank may be kept filled with preheated water, with circulation of antifreeze in coils 480 continued during the move. This can reduce the time and cost of heating water for disposal at the new location. Where the system 10A is closed down for a time period (such as overnight), the circulation of antifreeze in the coils 480 and the preheated water may prevent the system from freezing as temperatures drop below freezing at installed locations.

It will be appreciated that the system may include suitable pumps for circulation of the antifreeze and that any suitable antifreeze solution may be used.

Although propane tank 420 is shown as the source of fuel, it will be appreciated that other fuels may be used. For example, where used in a field producing natural gas, the produced gas may be directly used as fuel for disposal of produced water.

Using a system in accordance with the present disclosure, such as system 10 or 10A, it is estimated that from about one to about two gallons of liquid propane can be used to dispose of about one barrel of water as steam. At current pricing, a gallon of liquid propane can be obtained from about $0.60 to $0.80. Using a calculation of a price of $1.00/gallon of propane, the cost for disposing of a barrel of produced water using a system in accordance with this disclosure would be from about $1.00 to about $2.00. Current pricing to haul produced water from a Wyoming oilfield for injection in a disposal well is about $10.00/barrel. Accordingly, where the price of propane (or another suitable fuel) is less than the costs of disposal of liquid water, systems in accordance with the present disclosure are a cost effective solution to the disposal issue.

Methods in accordance with the present disclosure include methods of disposing of wastewater by evaporation as steam. In such methods, the wastewater is prepared for disposal by suitable filtering and/or treatment to meet the applicable regulations. It is then allowed to flow into a preheating tank where it is heated prior to disposal, which may be by coils extending from a heating area tank where they are heated by burner boxes that are fueled by propane or natural gas. From the preheating tank, heated water may then flow into evaporation coils, where it is heated above boiling and released as steam. The antifreeze filled coils may continue to flow to prevent freezing of the preheat tank when not in use or to maintain the temperature of the preheat tank. The method may further include moving the system with the preheat tank filled with preheated water to facilitate the use of the system at another location. They may also include calculating the costs of disposal and switching between steam evaporation and another method (hauling the water away by truck) as the costs of propane and fuel for the other methods vary.

While this disclosure has been described in certain embodiments, the present invention can be further modified with the spirit and scope of this disclosure. This application is therefore intended to cover any variations, uses, or adaptations of the invention using its general principles. Further, this application is intended to cover such departures from the present disclosure as come within known or customary practices in the art to which this invention pertains and which fall within the limits of the appended claims.

What is claimed is:

1. A system for disposing of produced water as steam released into the atmosphere, comprising:
   a tank for preheating water;
   a burn area comprising one or more burn units adjacent the tank;
   at least a first set of preheating coils comprising tubing that have a coiled portion disposed inside the tank and a coiled portion disposed outside the tank and over at least one burn unit in the burner area;
   at least a first set of evaporation coils comprising tubing in communication with an intake for receiving preheated water in the tank for preheating water, the at least a first set of evaporation coils having a coiled portion disposed outside the tank and over at least one burn unit in the burner area and an open end for the release of the water as steam; and
   an incoming water line for passing produced water into the tank for preheating water, the incoming water line running from a source of produced water to a discharge point in the tank with a series of windings adjacent the at least a first set of preheating coils and at least a first set of evaporation coils over the burn area.

2. The system of claim 1, further comprising a pretreatment system comprising at least a first centrifuge for removal of at least some solid material from the produced water prior to the running of the incoming water line adjacent the at least a first set of preheating coils and at least a first set of evaporation coils over the burn area.

3. The system of claim 2, wherein the pretreatment system further comprises a second centrifuge for removal of at least some oil from the produced water prior to the running of the incoming water line adjacent the at least a first set of preheating soils and at least a first set of evaporation coils over the burn area.

4. The system of claim 2, wherein the pretreatment system further comprises a reverse osmosis system disposed between the at least first centrifuge and the running of the incoming water line adjacent the at least a first set of preheating coils and at least a first set of evaporation coils over the burn area.

5. The system of claim 1, wherein the source of produced water comprises at least a first tank for storage of produced water.

6. The system of claim 1, wherein the burn area comprising individual burn units each associated with a single set of preheating coils or evaporation coils.

7. The system of claim 1, wherein the burn area is in communication with a source of fuel, comprising a propane tank.

8. The system of claim 1, wherein the at least a first set of preheating coils comprising tubing that having a coiled portion disposed inside the tank and a coiled portion disposed outside the tank and over at least one burn unit in the burner area comprises at least a first radiator bank disposed inside the tank in fluid communication with a second radiator bank disposed in the burner area.

9. The system of claim 8, wherein the at least a first set of preheating coils contains an antifreeze solution for conducting heat.

10. The system of claim 1, comprising two or more sets of preheating coils each set comprising tubing that having a coiled portion disposed inside the tank and a coiled portion disposed outside the tank and in the burner area.

11. The system of claim 1, wherein the at least a first set of evaporation coils comprises a radiator bank disposed in the burner area.

12. The system of claim 1, wherein the incoming water line running from a source of produced water to a discharge point in the tank with a series of windings adjacent the at least a first set of preheating coils and at least a first set of evaporation coils over the burn area comprises a radiator coiling over the at least a first set of preheating coils and at least a first set of evaporation coils.

13. The system of claim 12, wherein the incoming water line further comprises a set of windings inside the tank for preheating water over the at least a first set of preheating coils.

14. The system of claim 1, wherein the system is mounted on a skid.

15. A method for disposal of produced water, the method comprising
receiving produced water from a source of water with an incoming water line for discharge into a tank for preheating water;
passing the water line through a series of windings adjacent a portion of at least a first set of preheating coils containing antifreeze over a burn area and adjacent at least a first set of evaporation coils over the burn area prior to discharge in the tank for preheating;
circulating antifreeze in the at least a first set of preheating coils from a coiled portion in the burn area to a portion residing in the tank for preheating to preheat produced water in the tank for preheating;
receiving preheated water from the tank for preheating water at a preheated water intake into the at least a first set of evaporating coils and passing the water through the coils over at least one burn unit in the burn area to heat the water to steam; and
releasing the steam to the atmosphere.

16. The method of claim 15, further comprising pretreating the produced water by centrifuging for removal of at least some solid material prior to passing the water line through a series of windings adjacent a portion of at least a first set of preheating coils containing antifreeze over a burn area and adjacent at least a first set of evaporation coils over the burn area prior to discharge in the tank for preheating.

17. The method of claim 15, wherein passing the water line through a series of windings adjacent a portion of at least a first set of preheating coils containing antifreeze over a burn area and adjacent at least a first set of evaporation coils over the burn area prior to discharge in the tank for preheating further comprises passing the water line through a second series of windings disposed inside the tank for preheating water which are adjacent a portion of the preheating coils comprising at least a first radiator bank disposed inside the tank.

18. The method of claim 15, further comprising circulating the antifreeze in the at least a first set of preheating coils to maintain temperature in the preheating tank when the evaporation coils are not in use.

19. The method of claim 15, further comprising moving a system comprising the burn area, the tank for preheating water, the at least a first set of evaporation coils, the at least a first set of preheating coils; and the incoming water line from a first location to a second location with the tank for preheating water containing preheated water.

20. The method of claim 19, where moving a trailer or skid on which the system is mounted.

* * * * *